United States Patent
Van Horn et al.

(10) Patent No.: US 7,194,427 B1
(45) Date of Patent: Mar. 20, 2007

(54) ON-LINE GROUP-BUYING SALE WITH INCREASED VALUE SYSTEM AND METHOD

(75) Inventors: Tom Van Horn, Bellevue, WA (US); Dale A. Woodford, Redmond, WA (US); Richard V. Halbert, Redmond, WA (US); Jerome P. Pache, Seattle, WA (US); Greg C. Dean, Redmond, WA (US)

(73) Assignee: Vulcan Portals, Inc., Seattle, WA (US)

( * ) Notice: Subject to any disclaimer, the term of this patent is extended or adjusted under 35 U.S.C. 154(b) by 944 days.

(21) Appl. No.: 09/684,403

(22) Filed: Oct. 4, 2000

Related U.S. Application Data

(63) Continuation-in-part of application No. 09/519,023, filed on Mar. 3, 2000, which is a continuation of application No. 09/281,859, filed on Mar. 31, 1999, now Pat. No. 6,101,484.

(51) Int. Cl.
*G06Q 30/00* (2006.01)

(52) U.S. Cl. ...................................................... 705/26
(58) Field of Classification Search .................. 705/26, 705/27, 14, 400
See application file for complete search history.

(56) References Cited

U.S. PATENT DOCUMENTS 3,581,072 A  5/1971 Nymeyer ................... 235/152

(Continued)

FOREIGN PATENT DOCUMENTS

WO    WO 00/11570    3/2000

(Continued)

OTHER PUBLICATIONS

U.S. Appl. No. 09/233,274, filed Jan. 19, 1999, Leibzon et al.

(Continued)

*Primary Examiner*—Jeffrey A. Smith
(74) *Attorney, Agent, or Firm*—Fenwick & West, LLP

(57) ABSTRACT

In the definition of an on-line group-buying sale (122), a price of a featured item may be specified as a fixed amount, such as $25 per month. As indicated at (124), the sale 122 has an increasing incentive as more buyers (104) join the sale. Buyers (104) make offers as indicated at (126). As more buyers (104) make offers below a maximum threshold, the on-line group-buying sale software (120) increases the incentive as indicated at (128). At the conclusion of the sale (122), the on-line group-buying sale software (120) confirms acceptance of all offers specifying an incentive at or below the final, increased incentive in the sale (122), as indicated at (130). The modified pricing on-line group-buying sale can be applied to a variety of featured items, such as long distance calling plans, rebates for the purchase of an automobile, bank certificates of deposit, or credit instruments, with an increasing number of free long distance minutes, an increasing face value for the rebate, an increasing interest rate for the certificate of deposit, or a lower interest rate for the credit instrument, as more buyers join the sale.

19 Claims, 7 Drawing Sheets

U.S. PATENT DOCUMENTS

| | | | |
|---|---|---|---|
| 4,567,359 A | 1/1986 | Lockwood | 235/381 |
| 4,789,928 A | 12/1988 | Fujisaki | 364/401 |
| 4,949,248 A | 8/1990 | Caro | 364/200 |
| 5,148,365 A | 9/1992 | Dembo | 364/402 |
| 5,255,184 A | 10/1993 | Hornick et al. | 364/407 |
| 5,270,921 A | 12/1993 | Hornick | 364/407 |
| 5,377,095 A | 12/1994 | Maeda et al. | |
| 5,394,324 A | 2/1995 | Clearwater | |
| 5,576,951 A | 11/1996 | Lockwood | 395/227 |
| 5,640,569 A | 6/1997 | Miller et al. | 395/729 |
| 5,712,985 A | 1/1998 | Lee et al. | 395/207 |
| 5,724,521 A | 3/1998 | Dedrick | 395/226 |
| 5,727,165 A | 3/1998 | Ordish et al. | 395/237 |
| 5,729,700 A | 3/1998 | Melnikoff | 395/236 |
| 5,745,882 A | 4/1998 | Bixler et al. | 705/26 |
| 5,758,327 A | 5/1998 | Gardner et al. | 395/226 |
| 5,758,328 A | 5/1998 | Giovannoli | 395/201.226 |
| 5,765,143 A | 6/1998 | Sheldon et al. | 705/28 |
| 5,794,207 A | 8/1998 | Walker et al. | 705/23 |
| 5,794,219 A | 8/1998 | Brown | 705/37 |
| 5,797,127 A | 8/1998 | Walker et al. | 705/5 |
| 5,799,284 A | 8/1998 | Bourquin | 705/26 |
| 5,806,047 A | 9/1998 | Hackel et al. | 705/36 |
| 5,809,144 A | 9/1998 | Sirbu et al. | 380/25 |
| 5,818,914 A | 10/1998 | Fujisaki | 379/93.12 |
| 5,826,244 A | 10/1998 | Huberman | 705/37 |
| 5,832,459 A | 11/1998 | Cameron et al. | 705/26 |
| 5,835,896 A | 11/1998 | Fisher et al. | |
| 5,842,178 A | 11/1998 | Giovannoli | 705/26 |
| 5,845,265 A | 12/1998 | Woolston | 705/37 |
| 5,845,266 A | 12/1998 | Lupien et al. | 705/37 |
| 5,873,069 A | 2/1999 | Reuhl et al. | |
| 5,890,137 A | 3/1999 | Koreeda | 705/26 |
| 5,890,138 A | 3/1999 | Godin et al. | 705/26 |
| 5,895,454 A | 4/1999 | Harrington | 705/26 |
| 5,897,639 A | 4/1999 | Greef et al. | 707/103 |
| 5,913,210 A | 6/1999 | Call | 455/31.2 |
| 5,915,209 A | 6/1999 | Lawrence | 455/31.2 |
| 5,950,176 A | 9/1999 | Keiser et al. | 705/37 |
| 5,956,709 A | 9/1999 | Xue | 707/3 |
| 5,983,199 A | 11/1999 | Kaneko | 705/26 |
| 5,999,914 A | 12/1999 | Blinn et al. | |
| 6,014,644 A | 1/2000 | Erickson | 705/37 |
| 6,032,125 A | 2/2000 | Ando | |
| 6,035,288 A | 3/2000 | Solomon | 705/37 |
| 6,049,774 A | 4/2000 | Roy | |
| 6,055,504 A | 4/2000 | Chou et al. | 705/1 |
| 6,067,528 A | 5/2000 | Breed et al. | 705/26 |
| 6,076,070 A | 6/2000 | Stack | 705/37 |
| 6,081,789 A | 6/2000 | Purcell | 705/37 |
| 6,085,169 A | 7/2000 | Walker et al. | |
| 6,101,484 A | 8/2000 | Halbert et al. | |
| 6,112,189 A | 8/2000 | Rickard et al. | 705/37 |
| 6,119,101 A | 9/2000 | Peckover | 705/26 |
| 6,141,653 A | 10/2000 | Conklin et al. | |
| 6,141,666 A | 10/2000 | Tobin | |
| 6,260,024 B1 * | 7/2001 | Shkedy | 705/26 |
| 6,269,343 B1 * | 7/2001 | Pallakoff | 705/26 |
| 6,324,522 B2 | 11/2001 | Peterson et al. | |
| 6,418,415 B1 * | 7/2002 | Walker et al. | 705/26 |
| 6,473,740 B2 | 10/2002 | Cockrill et al. | |
| 6,516,302 B1 * | 2/2003 | Deaton et al. | 705/14 |
| 6,631,356 B1 | 10/2003 | Van Horn et al. | |

FOREIGN PATENT DOCUMENTS

| | | |
|---|---|---|
| WO | WO 00/30004 | 5/2000 |
| WO | WO 00/30005 | 5/2000 |
| WO | WO 00/34841 | 6/2000 |
| WO | WO 00/34842 | 6/2000 |
| WO | WO 00/34843 | 6/2000 |
| WO | WO 00/34886 | 6/2000 |
| WO | WO 00/43928 | 7/2000 |
| WO | WO 00/43929 | 7/2000 |
| WO | WO 00/43938 | 7/2000 |
| WO | WO 00/45318 | 8/2000 |
| WO | WO 00/48104 | 8/2000 |
| WO | WO 00/59224 | 10/2000 |

OTHER PUBLICATIONS

U.S. Appl. No. 09/249,727, filed Feb. 13, 1999, Ehrlich et al.
U.S. Appl. No. 09/250,039, filed Feb. 12, 1999, Grossman.
U.S. Appl. No. 09/348,812, filed Jul. 7, 1999, Reddi.
U.S. Appl. No. 60/097,932, filed Aug. 25, 1998, Pallakoff.
U.S. Appl. No. 60/097,933, filed Aug. 25, 1998, Pallakoff.
U.S. Appl. No. 60/116,729, filed Jan. 22, 1999, Reddi.
U.S. Appl. No. 60/118,189, filed Feb. 1, 1999, Ehrlich et al.
Search Report dated Aug. 24, 1999 for U.S. Appl. No. 09/270,219.
Search Report dated Sep. 8, 1999, for U.S. Appl. No. 09/281,859.
Search Report dated Nov. 22, 1999 for U.S. Appl. No. 09/409,237.
Search Report dated Sep. 21, 2000 for U.S. Appl. No. 09/596,921.
Dialog , The Gale Group Newsletter, "New Twist to Online Shopping: Service Hopes to Break Customer Apathy," Internet Week, 1(7), May 22, 1995.
Dialog, The Gale Group Newsletter, "In Year 2020, Auctions and Agents to Rule Web," Newsbytes, Mar. 23, 1998.
Dialog, "New Tricks in Pet Supplies" by Minkoff, J., Discount Merchandiser, 34(12)70-72, 1994.
Online Document from Software Patent Institute Database of Software Technology, http://m.spi.org/, Record 1: "Management Data Processing," Serial No. acmr6512.0039, Printed Sep. 20, 1999.
Online Document from Software Patent Institute Database of Software Technology, http://m.spi.org/, Record 2: "Management Science," Serial No. ACMGCL89.1066, Printed Sep. 20, 1999.
Online Document from Software Patent Institute Database of Software Technology, http://m.spi.org/, Record 17: "Distribution Resource Planning," Serial No. HPAPPS.2620, Printed Sep. 20, 1999.
Online Document from IBM Intellectual Property Network, http://www.patents.ibm.com/, Titled: Personalized Optimized Decision/Transaction Program, Jan. 1995, Reprinted Nov. 24, 1999.
Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities-Auctioned Off," "Collusion in Auctions," "Auction Bibliography," Dated 1996, Reprinted Oct. 25, 1999.
Online Document from Forbes.com, http://www.forbes.com, Forbes Global, Computer Science Section of Dec. 28, 1998, "Coming Soon-Cyber Co-ops" by Karlgaard, Printed Nov. 16, 1999.
Management and Specialist Team, LetsBuyIt.com, http://www.euroferret.com , Jan. 15, 1999; Online Document, http://www.alumni.se/e-commerce/default.htm, Jan. 15, 1999, Printed Nov. 19, 1999.
Online Document from Bid.com, http://www.bid.com/dutch, Printed Sep. 3, 1999.
Online Document from Bullnet Online Auctions, http://www.bullnet.co.uk/auctions/info.htm, Printed Sep. 3, 1999.
Online Document from Who's Who for the Commerce Standard, http://www.qii.com/standard/who/index.html. Printed Nov. 19, 1999.
Online Document from Cooperative Educational Service Agency, http://www.cesa5.k12.wi.us/buying.htm, Printed Sep. 20, 1999.
Online Document from Franklin Regional Council Governments, http://www.frcoq.or/purch.html, Printed Sep. 20, 1999.
Online Document from Klik-Klok Online Dutch Auction, http://www.klik-klok.com/how.htm, Printed Sep. 3, 1999.
Online Document, ComputerSweden, "Icon-grundare satsar närmare halv miljard på e-handel," http://nyheter.idg.se, Jan. 23, 1999 (w/English translation).
Online Document from Artiklar från AffärsData ("Resumé") , http://www.ad.se, Feb. 25, 1999 (w/English translation).

Online Document from ComputerSweden, "Lke;; Spångberg . . . ," http://nyheter.idg.se, Mar. 3, 1999.
Online Document from Accompany: About Team, http://www.accompany.com/about_press_faq.asp , Printed Mar. 3, 1999.
Online Document from Accompany: About US, http://www.accompany.com/about_press_0.asp, Printed Mar. 3, 1999.
Online Document from Accompany, About Team, http://www.accompany.com/about_team.asp, Printed Mar. 3, 1999.
Online Document from Accompany: About Team Advisors, http://www.accompany.com/about_team_advisors.asp, Printed Mar. 3, 1999.
Online Document from Accompany: About Team, http://www.accompany.com/about_press_analyst.asp, Printed Mar. 3, 1999.
Online Document from Accompany: About Team Advisors, http://www.accompany.com/about_teampartnes.asp, Printed Mar. 3, 1999.
Online Document from Accompany: Contact, http://www.accompany.com/about_contact.asp, Printed Mar. 3, 1999.
Online Document from Ask Reggie Domain Search, Accompany.com Domain contacts, http://www.askreggie.com, Printed Mar. 3, 1999.
Online Document from Accompany: About US, http://www.accompany.com/about_press_background.asp, Printed Mar. 3, 1999.
Online Document from ZDNN, http://www.zdnet.com/stories/news, Printed Mar. 3, 1999.
NewsAlert, "Accompany, Inc. to Revolutionize Commerce; Buys Come Together for Best Value," http://www.accompany.com, Printed Mar. 3, 1999.
Online Document from Yahoo, "Web startup pushes volume shopping," http://dailynews.yahoo.com, Printed Mar. 4, 1999.
Internet World (Mecklermedia), Cliff Figallo, "Hosting Web Communities," Building Relationships, Increasing Customer Loyality, and Maintaining a Competitive Edge.Published by John Wiley & Sons, Inc., Copyright 1998.
Abstract, World Reporter, Dagens Industri, "Expected success for internet shopping," WL 5900897, Mar. 12, 1999.
Article from Sportfack, "Letsbuyit.com Kommer," Feb. 12, 1999. (w/English translation).
IBM Technical Disclosure Bulletin, "Multi-Product Delivery System Optimization Procedure," 38(4) :502-503, Apr. 1995.
Kroll et al., "World Weary Web," Forbes, Dec. 28, 1998, pp. 98-100.
Pant et al., "Business on the Web: Strategies and Economics," Fifth International WWW Conference, May 6-10, 1996, Paris, France.
Rockoff et al., "Design of an Internet-based System for Remote Dutch Auctions," *Internet Research: Electronic Networking Applications and Policy*, 5(4):10-16, 1995.
Stang et al., "Scans" Section, *Wired*, Sep. 1995, pp. 51, 54, 56 and 58.
Woolley, "Price War!," *Forbes*, Dec. 14, 1998, pp. 182 and 184.
Online Document from OCM, http://www.cynric.org/OCM/administration/management/services/coop.html, Printed Sep. 20, 1999.
Online Document from Dagens Industri, "Rush into Net-shopping," http://www.di.se/Scripts/, Document dated Mar. 12, 1999, Printed Jan. 19, 2000 (with English Translation).
Online Document, "US-IL-Chicago-Cargo Revenue Management Analyst," "US-IL-Chicago—Revenue Manager," "US-IN-Indianapolis—Yield Analyst," "US-CA-San Jose—Financial Analyst," http://jobsearch.monster.com, Printed Mar. 24, 1999.
Online Document from hotjobs.com, "Filenet Corporation," http://www.hotjobs.com, Printed Mar. 24, 1999.
Online Document from The Revenue Management Home Page, "Revenue Management Defined," wysiwyg://212/http://www.geocities.com/WallStreet/Floor/4921/ , Printed Mar. 18, 1999.
Online Document from The Revenue Management Home Page, "Articles on Revenue Management," wysiwyg://212/http://www.geocities.com/WallStreet/Floor/4921/articles.htm, Printed Mar. 18, 1999.
Online Document from The Revenue Management Home Page, "Companies Practicing Revenue Management," wysiwyg://212/http://www.geocities.com/WallStreet/Floor/4921/rmcomps.htm, Printed Mar. 18, 1999.

Online Document from Revenue Management Systems, Inc., "What is Revenue Management?" http://www.revenuemanagement.com/whatisrm.htm, Printed Mar. 19, 1999.
Online Document from profitoptim.com, "Definition of Revenue Management," http://www.profitoptim.com/papersdirectory/rmdaybrief/sld063.htm, Printed Mar. 19, 1999.
Online Document from profitoptim.com, "What is Revenue Management (cont.)?" http://www.profitoptim.com/papersdirectory/resexpo97/sld006.htm, Printed Mar. 19, 1999.
Online Document from American Way, "How Airline Pricing Works," http://www.aa.com/away/Vantage-may98.htm, Printed Mar. 18, 1999.
Online Document from Airline Discount, http://faculty.darden.edu/pfeiferp/airline.htm, Printed Mar. 18, 1999.
Online Document from The Innovation Network, "1994 Innovation Collection," http://198.49.220.47/texis/si/sc/i...e/+KoeMUi3WwB-me+It0X0www/full.html, Printed Mar. 19, 1999.
Online Article by W. Lieberman of Veritec Solutions, Inc., "Yield Management: System or Program?" http://www.veritecsolutions.com, Site visited on Mar. 19, 1999.
Online Article by W. Lieberman of Veritec Solutions, Inc., "Making Yield Management Work for You: Ten Steps to Enhanced Revenues," http://www.veritecsolutions.com, Site visited on Mar. 19, 1999.
Online Article by W. Lieberman of Veritec Solutions, Inc., "Debunking the Myths of Yield Management" http://www.veritecsolutions.com, Site visited on Mar. 19, 1999.
Online Document from StoreSearch Internet Shopping Guide, http://www.storesearch.com/, Site visited on Aug. 31, 1999.
Online Document from Netscape Netcenter, http://shop.netscape.com/auctions/main.adp, Site visited on Aug. 31, 1999.
Online Document from Yahoo! Auctions, http://auctions.yahoo.com/, Site visited on Aug. 31, 1999.
Online Document from Lycos: Sales & Specials, http://www.lycos.com/Shopping/sales_and_specoals/, Sited visited on Aug. 31, 1999.
Hutchinson, "E-Commerce: Building a Model," Communications Week, pp. 57-60, Mar. 17, 1997.
M2 Communications, "Icentral Inc: Web Retailers Band Together to Build Traffic and Sales," M2 Presswire, Feb. 25, 1997.
Berryman et al., "Electronic commerce: Three Emerging Strategies," McKinsey Quarterly, No. 1, pp. 152-159, 1998.
"BuyItOnline Revolutionizes Internet Retailing for Small Business Merchants," Business Wire, Sep. 8, 1998.
Press Release from MobShop, formerly known as Accompany, Inc., obtained from the Internet at http://www.mobshop.com/press_release?release=20 on Apr. 10, 2000, which explains that Accompany, Inc. received a Notice of Allowance from the U.S. Patent and Trademark Office.
Press Release from iCoop, Inc. obtained from the Internet at http://wwww.icoop.com/press_pressrelease2.htm on Apr. 10, 2000, which explains that iCoop.com, Inc. has filed two patent applications and has provisional patent applications which were filed on Jan. 22, 1999.
Press Release from beMANY! obtained from the Internet at http://www.bemany.com/press02112000_bemany.html on Apr. 10, 2000, which explains that beMANY! has a "patent pending process."
Press Release from the company BazaarE.com obtained from the Internet at http://www.bazaare.com/pr_ 03111999.cfm?CFID=629 16&CFTOKEN=75630214 on Apr. 10, 2000, which explains that BazaarE.com has a "patent-pending platform."
Bailey et al., "An Exploratory Study of the Emerging Role of Electronic Intermediaries," International Journal of Electronic Commerce, 1(3):7-20 (1997).
"Retail Federation Group Buying," HFD-The Weekly Home Furnishing Newspaper, v0, n0, p. 9, Dec. 26, 1994.
"Frontier Rings Up A Sale with National Retail Federation," PR Newswire, p. 119NYM057, Jan. 19, 1998.
"NRF: home page on World Wide Web (National Foundation Launches Site)," The Weekly Newspaper for the Home Furnishing Network, v70, n42, p. 10(1), Oct. 14, 1996.
"Retail Federation Group Buying Set," HFD—The Weekly Home Furnishings Newspaper, v68, n52, p. 9(1), Dec. 26, 1994.

"Mosher Views ARA as Survival Kit for Small Specialty Stores," Daily News Record, v24, n22, p. 4(1), Feb. 2, 1994.

"KMART Targets GE as EDI Provider Signals GE's Re-Commitment to EDI," EDI News, v11, n21, Oct. 13, 1997.

"National Retail Federation Selects GE Information Services for EDI Service Partnership," PR Newswire, p1006DCM009, Oct. 6, 1997.

Mielczarski, W.; Michalik, G.; Widjaja, M.; "Bidding strategies in electricity markets,"PIC Proceedings of the 21st 1999 IEEE International Conference, pp. 71-76, May 16-21, 1999, Cat.#CH36351, 1999.

Online document from Savvio.com, "Savvio.com: Our Story," wysiwyg://8/http://www.savvio.com/about/aboutUs.jsp, Printed Sep. 28, 2000.

Online document from MediaBuyingExchange.com, "On-line Media Negotiation Room Coming to Media Buying Exchange," http://www.mediabuyingexchange.com/negotiating.html, Visited Sep. 7, 2000.

Online document from MediaBuyingExchange.com, "This just in . . . ," http://www.mediabuyingexchange.com/index2.html, pp. 1-2, Visited Sep. 7, 2000.

Hagel III et al., "The new infomediaries," *The McKinsey Quarterly*, 1997 No. 4, pp. 54-71.

US 6,000,826, 12/1999, Parunak et al. (withdrawn)

* cited by examiner

Duesenberg      MERCATA

Current Rebate:    $125 —702

Make an Offer —704

Using Mercata's PowerBuy™ technology, Duesenberg and Mercata have partnered to bring you a unique opportunity. In this PowerBuy™, we're giving you the power to drive up the value of your rebate on a new 2000 or 2001 Duesenberg. It's so simple! Just join the PowerBuy™ rebate by making an offer of $50, and watch the rebate value raise as more people join in the fun! The more people make an offer, the greater the value of the rebate everyone receives. And the rebate value can only go up.

This PowerBuy™ deal runs from October 19 through October 26, 2000. As it runs, watch the value of your rebate increase. Then, after the PowerBuy™ deal closes, simply go to your Account, print out your certificate and redeem it on a beautiful 2000 or 2001 Duesenberg at your favorite Duesenberg dealership. For more information on all the Duesenberg has to offer, visit www.duesenberg.com/index.html.

FIG. 7

*Duesenberg*      MERCATA

There is a limit of 1 item per customer

| Billing Information |

Gre Dean
xdsegkmhu
Bellevue, WA 96004
(555) 555-5555

Visa # xxxxxxxxxx1111
Expires Sep 2001

— 802

| | SKU | Description | Current Rebate Value | Enter the Rebate You Want | Cost |
|---|---|---|---|---|---|
| 1 | 224120324 | Duesenberg Rebate | $125.00 | 500.00 | $50.00 |

|  |  |
|---|---|
| Subtotal: | $50.00 |
| Sales Tax: | $0.00 |
| Total Charges: | $50.00 |

To approve, click the "Confirm Offer" button below. If you make changes, click the "Recalculate" button.

| Recalculate |

Before you submit your offer:

1. Review all information.
    2. Understand that your office is guaranteed by your credit card, and represents a legally binding,
        non-cancellable commitment to purchase the PowerBuy™ rebate item if the ending PowerBuy™
        Rebate Value is equal to, or above the minimum Rebate specified in your offer.
    3. Read and understand our Terms and Conditions. By clicking the "Confirm Offer" button below,
        you are agreeing that these terms will apply to this purchase.

| Confirm Offer |

FIG. 8      800

*Duesenberg*       MERCATA

*Duesenberg* "PowerBuy™" Rebate Certificate

$125

This certificate entitles the person named below to a rebate in the amount of $125.00 on the purchase of a new 2000 or 2001 *Duesenberg*

Exclusively for:     John Thrun
110- 10th Avenue
Suite 110
Bellevue, WA 98004

Certificate#:     BE43C99366C5F4D15FBA18C54B39E22E

To receive your rebate, print this certificate and present it to your participating Duesenberg dealer upon purchasing your 2000 or 2001 Duesenberg. For questions, please call 1-800-555-1212

Dealers: Please call Duesenberg Program Headquarters at 1-800-999-9999 to validate certificate.

Terms and conditions

(Legal language goes here)

FIG. 9

ND-LINE GROUP-BUYING SALE WITH
INCREASED VALUE SYSTEM AND
METHOD

CROSS REFERENCE TO RELATED
APPLICATION

This application is a continuation-in-part of commonly assigned U.S. patent application Ser. No. 09/519,023, filed Mar. 3, 2000, which is in turn a continuation of U.S. patent application Ser. No. 09/281,859, filed Mar. 31, 1999 in the names of Richard V. Halbert, Niklas Gustafsson and John M. Thrun, and entitled "Dynamic Market Equilibrium Management System, Process and Article of Manufacture," now U.S. Pat. No. 6,101,484, issued Aug. 8, 2000.

BACKGROUND OF THE INVENTION

1. Field of the Invention

The present invention relates to an electronic group buying system for the sale of goods and services, also sometimes referred to herein as an "online buying group." More particularly, embodiments of the invention relate to such on-line buying groups and systems of the type described and claimed in a related copending, commonly assigned application filed Mar. 15, 1999 in the names of Tom Van Horn, Niklas Gustafsson and Dale Woodford, and entitled "Demand Aggregation Through Online Buying Groups," U.S. patent application Ser. No. 09/270,219; commonly owned U.S. Pat. No. 6,101,484, issued Aug. 8, 2000 to Richard V. Halbert et al. and entitled "Dynamic Market Equilibrium Management System, Process and Article of Manufacture"; a copending, commonly assigned application filed Sep. 30, 1999 in the names of Tom Van Horn, Jon C. Engman, Richard V. Halbert, Niklas Gustafsson, Dale Woodford, Jerome P. Pache, and Greg C. Dean, and entitled: "System and Method for Extension of Group Buying Throughout the Internet," U.S. patent application Ser. No. 09/409,237; and a copending, commonly assigned application filed Jun. 19, 2000 in the names of Tom Van Horn, Dale A. Woodford, Richard V. Halbert, and Kevin Dean Wampler, entitled "System and Method for Enhancing Buyer and Seller Interaction During a Group Buying Sale," U.S. patent application Ser. No. 09/596,921; the disclosures of which are hereby incorporated by reference herein. The invention further relates to such a system, process and article of manufacture that utilizes modified pricing to provide the advantages of group purchasing power in an on-line group-buying sale.

2. Introduction to the Invention

The inventions described and claimed in the above applications and issued U.S. Patent allow efficient and convenient implementation of on-line group-buying sales of goods and services. As described in those applications, an on-line group-buying sale typically results in a decreasing price of a product or service offered in the sale as more buyers join the group by making offers to purchase the product. While this approach is appropriate for many products and services, there are some products and services that would benefit from a different form of pricing, while still maintaining the principle that buyers receive a better value as more buyers join an on-line group-buying sale.

Many on-line group-buying sales, e.g., in implementations by the assignee of this application, may be completed at the sale's end through the user of a debiting mechanism, (e.g., a buyer's credit card) to pay for the goods. For obvious reasons, the use of a credit card is the preferred method of handling payment in e-commerce. However, credit card payment, as well as other forms of debit payment, represents a problem in the case of relatively high priced goods and services, such as automobiles, since most card holders do not have high enough credit limits to pay for an automobile or similar high priced merchandise. It is further desirable to allow such on-line group-buying sales to be carried out in a way that will promote the product without causing channel conflict, i.e., without disturbing existing sales channels for the product. It is therefore desirable to provide a modified form of an on-line group-buying sale for products, services, sellers and partners that would benefit from marketing a decreasing price for their product in a new way.

Other ways in which this invention provides unique benefits in on-line group-buying sales are set forth in various parts of this document below.

3. Background

The systems, processes and articles of manufacture described in the above related pending applications and issued patent disclose the use of decreasing purchase prices in on-line group-buying sales. A pertinent disclosure in the issued patent is the teaching at col. 7, lines 54–56 that a price curve with an increasing price for a product could be utilized.

Additional specific examples of e-commerce systems implemented on the Internet or other networks are disclosed in the prior art references of record in the prosecution of the related patent and the related pending applications. The interested reader is referred to those prior art references for further description of those systems.

SUMMARY OF THE INVENTION

1. Definitions

Customer—a person who participates in an on-line group-buying sales method by either accessing the on-line group-buying sale from the owner's main site or via a remote location, such as a partner site.

Display—to show an on-line group-buying sale featured item to a customer on the owner's main site, such as by showing the customer a page on the owner's main site that describes the featured item. A page is a specific portion of the totality of the owner's main site and does not necessarily refer to any particular method of displaying the page to a viewer/customer. Of course, display also includes showing an on-line group-buying sale item to a customer at the owner's main site. Moreover, the on-line group-buying sale item may be displayed on any type of display device, including a computer monitor, a telephone, a portable computer, a pager, and a television. The display may also include and/or be limited to audible information.

Electronic Network—an electronic communication medium across which sellers and buyers may communicate, especially when communicating through the owner's main site. Representative electronic networks include the Internet, intranets, the public switched telephone network ("PSTN"), wireless voice and data networks, and television networks, such as satellite, broadcast, cable television, and two-way interactive cable. Electronic networks further include hybrid systems, such as those in which sellers communicate to buyers via one medium, such as cable television, and buyers communicate to sellers via another medium, such as the Internet. Electronic networks additionally include aggregated electronic networks, such as when buyers communicate to sellers via multiple media, such the Internet, the telephone, and cable television.

Featured Item—a product or service, or groups of products and services, offered for sale in an on-line group-buying sales method. Services may include any type of service, such as product service agreements, one-time services like vacations, and semi-permanent services, such as club memberships. Featured Items may also include a bundle of products/services, such as a DVD player, a case, an extended warranty, one-year theft insurance, and two free DVDs. For bundled featured items, demand aggregation in an on-line group-buying sale need not necessarily arise on specific items in the bundle or identical purchases of the full bundle but may also arise in a piecemeal fashion via purchases of individual items or subsets of items within the bundle, which may potentially increase the volume discount on any or all items within the bundle and/or purchases of the bundle as a whole. Featured items may include coupons, rebates, chits and other forms of credits applicable against a purchase price for a product or service.

On-Line Group-Buying Sale—a business method and its variants in which buyers wishing to purchase a particular product or service, or groups of products and services, within a given time frame join forces in a buying group formed across an electronic network specifically to accomplish the desired purchase. On-line group-buying sales are sometimes referred to as "PowerBuys™," a specific format for on-line group-buying sales presently practiced by Mercata, Inc. of Bellevue, Wash. In an on-line group-buying sale, the buying group potentially enables individual buyers to leverage their combined purchasing power to achieve an economic bargain superior to that attainable by any one buyer acting alone. A superior bargain for buyers may often be reflected in terms of a lower price. For example, as more buyers join the buying group, the desired item's price typically declines. At the end of the purchase period, the owner (and/or seller) allows all successful buyers (i.e., those with offers at or above the final on-line group-buying sale price) to purchase the item at a final (low) price even if some buyers have submitted irrevocable offers specifying a price ceiling higher than the final (low) price. In some embodiments, the owner may complete the sales transaction with each buyer by accepting offers at or above the final price, charging each successful buyer's credit card at the time the purchased featured item is shipped to the buyer. In other embodiments, the owner may not complete purchase transactions directly with the buyers but may instead refer irrevocable and revocable purchase offers (or other expressions of interest in the featured item) to a partner or third-party seller who may then complete individual buyer transactions within the buying group by accepting any desirable irrevocable purchase offers and/or pursuing buyers' expressions of interest in a featured item.

Owner—the party owning and/or having a license for the right to operate the platform hosting on-line group-buying sales and/or facilitating on-line group-buying sale displays on partner sites. For example, the owner may be the owner of the invention described herein and the related inventions cross-referenced herein, or a licensee of such owner. The terms "owner" and "operator" are generally synonymous in this context.

Owner's Main Site—a computer-operated location, such as a website, on which the on-line group-buying sale platform or hub resides. For purposes of at least one embodiment of the invention, this site is an owner's site on which the on-line group-buying sale method of sales is being practiced in accordance with the commonly assigned inventions referred to above. An ordinarily skilled artisan will recognize that the on-line group-buying sale platform may provide a virtual presence only, with a substantial portion of the actual computing power driving the on-line group-buying sales method located elsewhere. In addition, embodiments of the invention are not limited to a single owner's main site. Embodiments of the invention are not limited to websites and/or communications using HTTP and may include computer-operated locations such as cable TV, digital interactive cable, etc.

Partner Site—any third-party owned or operated location, such as a website, within an electronic network, such as the Internet, that has been configured to display one or more on-line group-buying sales at their network location or website. The universe of partner sites potentially could encompass an entire network such as the Internet and/or a channel(s) of a cable television network and/or wireless voice and data networks. However, it is expected that certain network locations or websites would be barred from participation for various reasons, e.g., inappropriate content. Of course, partner sites, seller sites, and/or an operator's site may be combined into one website.

Rebate—any form of a price reduction coupon or discount, whether credited at the time of sale or as a refund of a portion of the purchase price of a product or service.

Seller—a manufacturer, retailer, service provider, partner, or other party (e.g., another customer) offering products/services for sale to customers, businesses, or other buyers via the on-line group-buying sales method. The owner, its partners, and other customers may be sellers in some embodiments of the invention.

Other terms used in this application that are defined in the above referenced related applications have the meanings used in those applications, except where redefined herein.

2. Summary Description

In accordance with a first aspect of the invention, a system for carrying out an on-line group-buying sale for a featured item has an e-commerce server data processing system. The e-commerce server data processing system includes e-commerce server software executable on the e-commerce server data processing system and configured to define the on-line group-buying sale of the featured item. A buyer client data processing system is coupled to the e-commerce server data processing system. The buyer client data processing system includes client software executable on the buyer client data processing system. The client software is configured to receive a buyer input for making an offer in the on-line group-buying sale of the featured item, and to transmit the buyer offer to the e-commerce server data processing system. The e-commerce server software is configured to transmit at least some information defining the on-line group buying sale to the buyer client data processing system. The e-commerce server software is further configured to define a value curve for the featured item representing an increasing value of the featured item as more buyers make offers in the on-line group-buying sale.

In a second aspect of the invention, a computer-implemented process for carrying out an on-line group-buying sale for a featured item includes the step of defining the on-line group-buying sale of the featured item. Buyer inputs are received for making offers in the on-line group-buying sale of the featured item. A value of the featured item is increased as more buyers make offers in the on-line group-buying sale.

In a third aspect of the invention, an article of manufacture comprises a computer readable medium having stored therein a computer program for carrying out an on-line group-buying sale for a featured item. The computer program includes a first code segment defining the on-line group-buying sale of the featured item. A second code segment is configured to receive buyer inputs for making offers in the on-line group-buying sale of the featured item. A third code segment is configured to increase the value of the featured item as more buyers make offers in the on-line group-buying sale.

In a fourth aspect of the invention, a system for carrying out an on-line group-buying sale for a featured item has an e-commerce server data processing system. The e-commerce server data processing system includes e-commerce server software executable on the e-commerce server data processing system and configured to define the on-line group-buying sale of the featured item as a rebate for purchase of a good or service. A buyer client data processing system is coupled to the e-commerce server data processing system. The buyer client data processing system includes client software executable on the buyer client data processing system. The client software is configured to receive a buyer input for making an offer in the on-line group-buying sale of the rebate, and to transmit the buyer offer to the e-commerce server data processing system. The e-commerce server software is configured to transmit at least some information defining the on-line group buying sale to the buyer client data processing system.

In a fifth aspect of the invention, a computer-implemented process for carrying out an on-line group-buying sale for a featured item includes the step of defining the on-line group-buying sale of the featured item as a sale of a rebate for use in purchasing a good or service. Buyer inputs are received for making offers in the on-line group-buying sale of the rebate. Terms of the rebate sale are changed as more buyers make offers in the on-line group-buying sale.

In a sixth aspect of the invention, an article of manufacture comprises a computer readable medium having stored therein a computer program carrying out an on-line group-buying sale for a featured item. The computer program has a first code segment defining the on-line group-buying sale of the featured item as a sale of a rebate for use in purchasing a good or service. A second code segment receives buyer inputs for making offers in the on-line group-buying sale of the rebate. A third code segment changes terms of the rebate sale as more buyers make offers in the on-line group-buying sale.

In a seventh aspect of the invention, a system is configured to carry out an on-line group-buying sale for a credit instrument. The system includes an e-commerce server data processing system. The e-commerce server data processing system includes e-commerce server software executable on the e-commerce server data processing system and configured to define the on-line group-buying sale of the credit instrument. A buyer client data processing system is coupled to said e-commerce server data processing system. The buyer client data processing system includes client software executable on the buyer client data processing system. The client software is configured to receive a buyer input for making an offer in the on-line group-buying sale of the credit instrument, and to transmit the buyer offer to the e-commerce server data processing system. The e-commerce server software is configured to transmit at least some information defining the on-line group buying sale to the buyer client data processing system.

In an eighth aspect of the invention, a computer-implemented process for carrying out an on-line group-buying sale for a credit instrument includes the step of defining the on-line group-buying sale of the credit instrument. Buyer inputs are received for making offers in the on-line group-buying sale of the credit instrument. Terms of the credit instrument sale are changed as more buyers make offers in the on-line group-buying sale.

In an eighth aspect of the invention, an article of manufacture comprises a computer readable medium having stored therein a computer program for carrying out an on-line group-buying sale for a credit instrument. The computer program includes a first code segment defining the on-line group-buying sale of the credit instrument. A second code segment receives buyer inputs for making offers in the on-line group-buying sale of the credit instrument. A third code segment changes terms of the credit instrument sale as more buyers make offers in the on-line group-buying sale.

The attainment of the foregoing and related advantages and features of the invention should be more readily apparent to an ordinary artisan, after review of the accompanying more detailed description of the invention, taken together with the drawings, in which:

BRIEF DESCRIPTION OF THE DRAWINGS

FIGS. 7–9 are screen shots obtained during operation an embodiment of the invention.

DESCRIPTION OF SPECIFIC EMBODIMENTS

Figure 1:
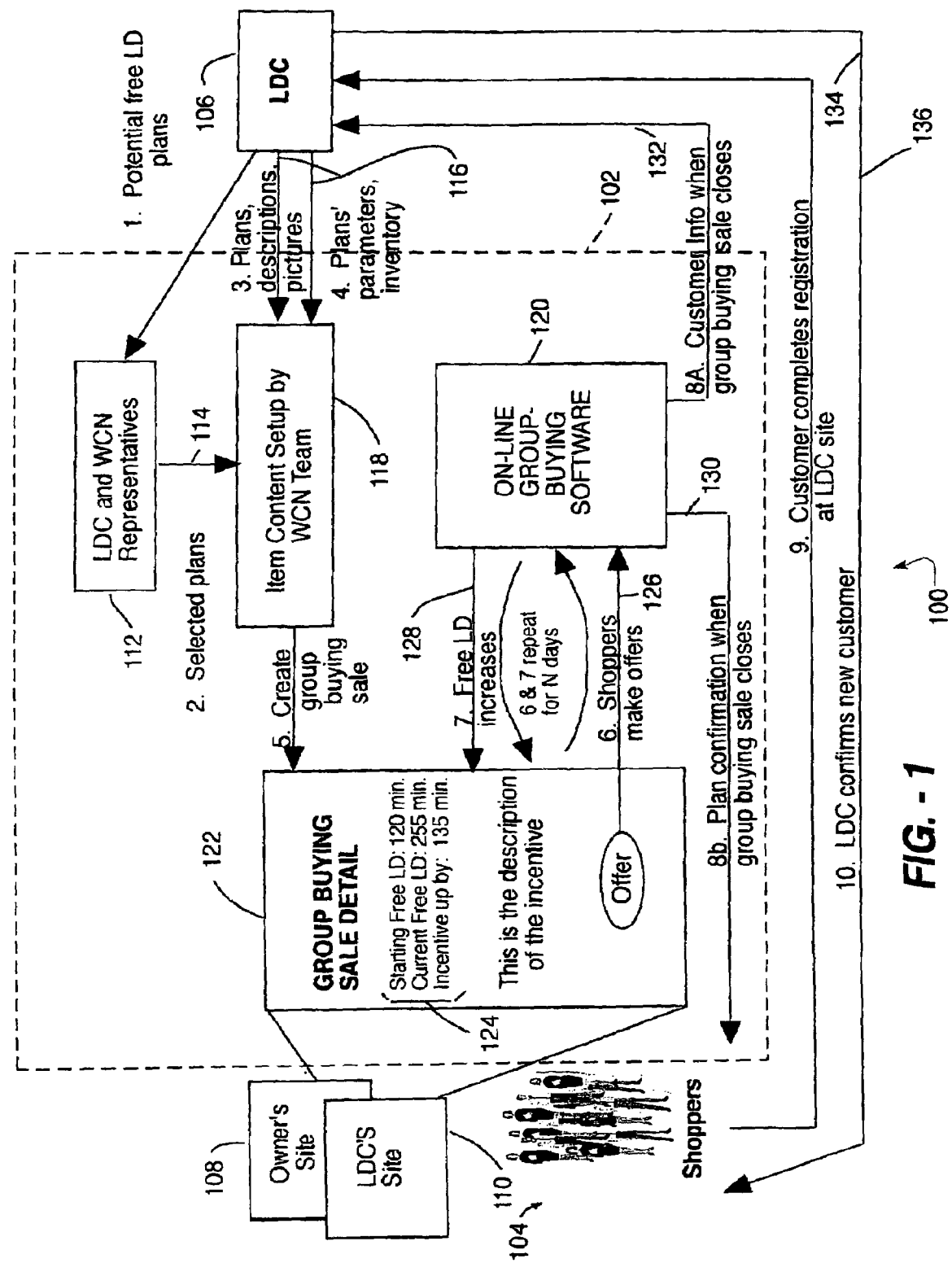
FIG. 1 is a block diagram of an internetworked computer system showing processing flows for implementing an embodiment of the invention.

The drawings show preferred forms of an on-line group-buying sale system, process and article of manufacture suitable for implementing the invention. Embodiments of the invention provide a modified pricing on-line group-buying sale capability that enables certain goods and services to be marketed more effectively. FIG. 1 of the drawings shows a preferred form of a system and process for implementing an embodiment of the invention that pertains the sale of long distance calling plans. As shown in FIG. 1, an embodiment of the invention combines for a given on-line group-buying sale 100 an owner's main site (i.e., We-Commerce Network™ ("WCN") 102) and its customers (i.e., customers 104) with traffic coming from a long distance carrier ("LDC") 106 and its respective customers 104. Customers 104 communicate with the WCN network 102 through the owner's website 108 and the LDC's website 110. In order to set up on-line group-buying sales for long distance calling services, the LDC 106 and WCN 100 representatives review potential free long distance plans at 112. Selected plans are supplied to WCN 100 representatives at 114. Further information for setting up the on-line group-buying sales are supplied to the WCN 100 representatives by the LDC 106 at 116. Content for an on-line group-buying sale of a long distance calling plan is set up by the WCN 100 representatives at 118, using the owner's on-line group-buying sale software 120, which is more fully described in the above related issued patent. When the WCN 100 staff has completed defining the on-line group-buying sale 122 for the long distance plan, details of the sale 122 are posted on the owner's website 108 and the LDC's website 110.

In addition to setting up on-line group-buying sales, the on-line group-buying sale software 120 runs the sales, may confirm purchases at the conclusion of the sale, and may handle fulfillment of the sales, although in this example, the fulfillment is handled by the LDC 106 as will be discussed in more detail below. Further information on the on-line group-buying sale software 120 is contained in the above related pending applications and issued patent, to which the interested reader is referred. Other than as modified in the teachings below, the on-line group-buying sale software 120 may be identical to that described in the applications and patent incorporated herein by reference.

In the definition of the on-line group-buying sale 122, the price of the long distance calling plan may be specified as a fixed amount, such as $25 per month. As indicated at 124, the sale 122 includes an incentive of free long distance minutes, shown as 120 free minutes at the beginning of the sale, and 255 free minutes at the intermediate time of the display shown for the sale 122. Buyers 104 make offers as indicated at 126, in the form of how many free long distance minutes they want in order for their offer for the calling plan to be irrevocable at its fixed price of $25 per month. As more buyers 104 make offers below a maximum threshold for free minutes, the on-line group-buying sale software 120 increases the number of free minutes of the incentive as indicated at 128. Offers indicating too many free minutes, which are not likely to be reached during the sale, are ignored by the software 120 for the purpose of increasing the number of free minutes. Should the number of free minutes increase enough as more buyers make offers within a defined threshold, i.e., between a price or value curve and an ignore threshold curve (see FIGS. 2–6), an offer which is initially ignored as unlikely to be accepted may be subsequently accepted. At the conclusion of the sale 122, the on-line group-buying sale software 120 may confirm acceptance of all offers specifying a number of free minutes at or below the final, increased number of free minutes in the sale 122, as indicated at 130. The software then supplies appropriate information at 132 to the LDC 106 for completion of order fulfillment. The successful buyers 102 in the sale 122 register with the LDC at 134, and the LDC confirms its new customers 104 at 136. As an ordinary artisan will recognize, the steps of order confirmation and order fulfillment may be performed by the seller's software based on information transmitted from the software 120.

As described, the better value for the buyers 104 in the sale 122 is a larger number of free long distance calling minutes as more buyers 104 participate in the on-line group-buying sale 122, while the monthly rate for the LDC plan remains the same. This is in contrast to a conventional on-line group-buying sale as described in the related applications and patents, in which the better value for the buyers is a lower price for the featured item as more buyers participate.

Figure 2:
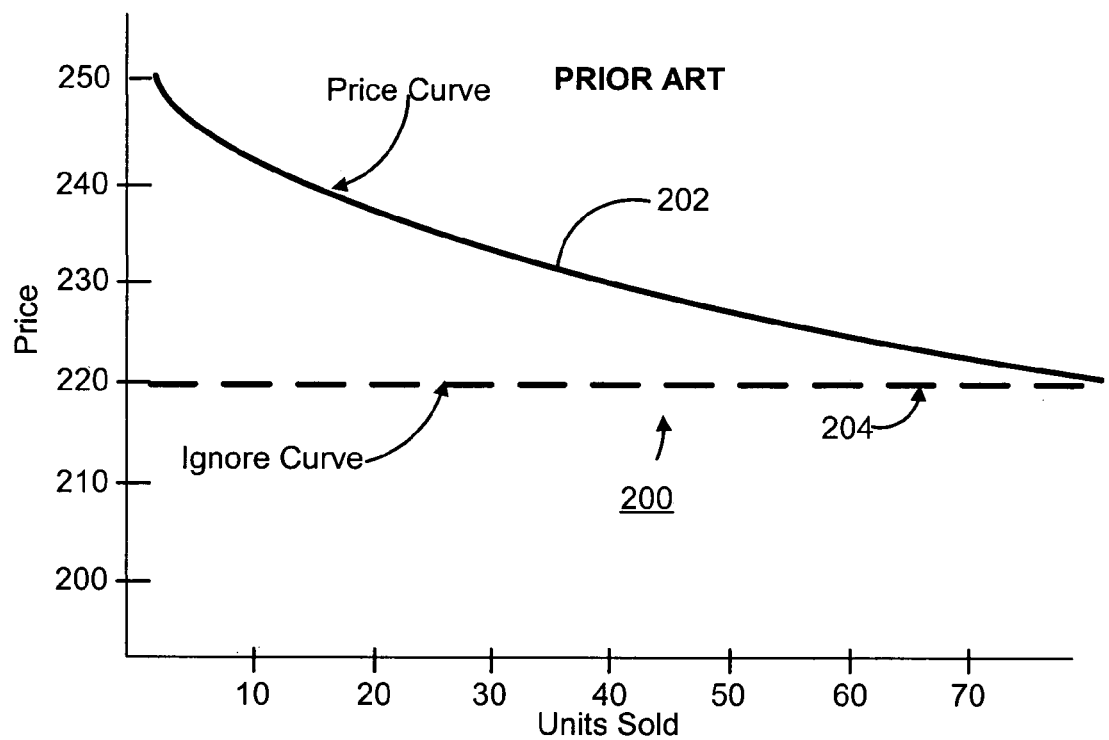
FIG. 2 is a graph of a price curve for a conventional on-line group-buying sale.
Figure 3:
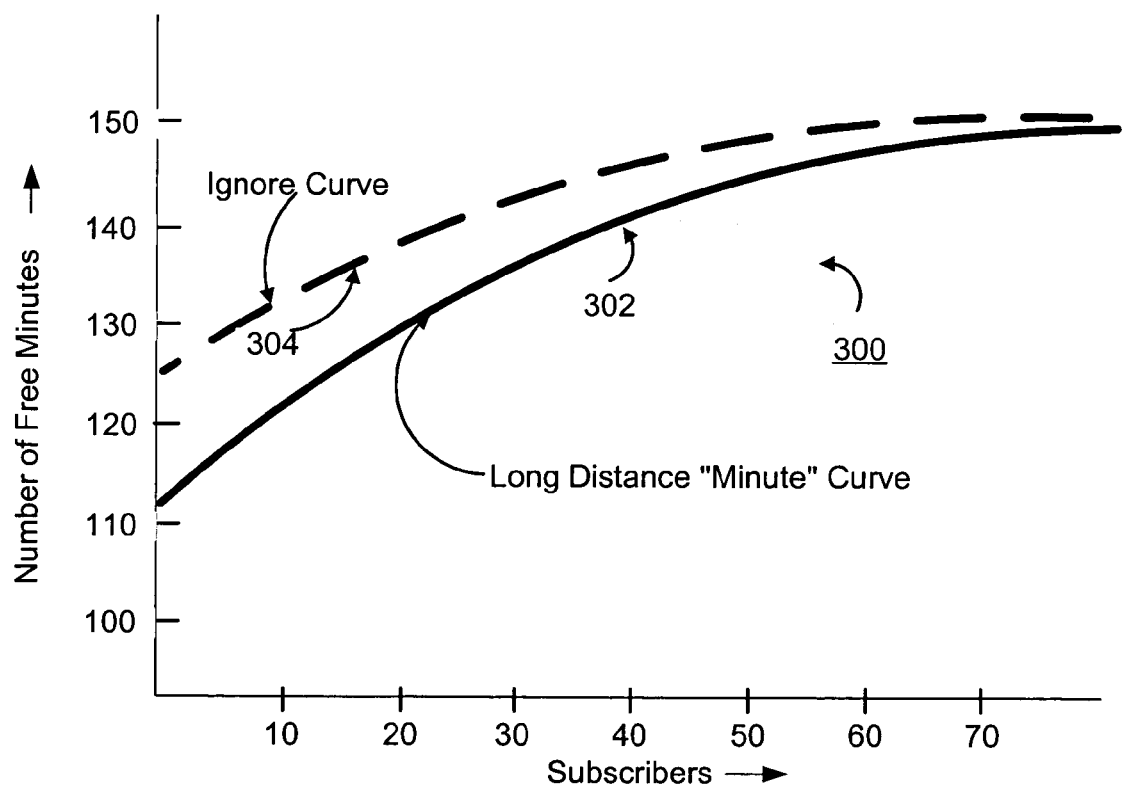
FIGS. 3–6 are graphs of price curves for on-line group-buying sales in accordance with embodiments of the invention.

The difference between these two types of on-line group-buying sales is shown in more detail in FIGS. 2 and 3, which respectively illustrate price curves 200 and 300 for a conventional on-line group-buying sale (FIG. 2) and the modified pricing on-line group-buying sale 122 (FIG. 3). In FIG. 2, the number of units sold is plotted on the x-axis, and price is plotted on the y-axis. As shown, the price curve 202 has a negative slope, indicating that the price of each unit in the sale decreases with the number of units sold. As long as an offer is at a price above ignore curve 204, it will be counted for modifying the price curve 202 as the sale progresses. Details on establishing the ignore curve 204 are found in the above related issued patent.

In the price curves 300 of FIG. 3, the number of subscribers 104 (customers) for the sale 122 is plotted on the x-axis, and the number of free long distance minutes is plotted on the y-axis. A price or value curve 302 has a positive slope, representing an increase in the number of free long distance minutes as the number of buyers or subscribers 104 making offers increases, provided that the offers are for a number of free minutes between ignore curve 304 and price or value curve 302.

FIG. 7 is an opening screen display 700 for another embodiment of an on-line group-buying sale utilizing a networked computer system similar to that shown in FIG. 1. In this representative example, the featured item is a rebate on the purchase price of a Duesenberg automobile. A rebate may be sold, rather than the automobile itself, in order to permit the automobile's manufacturer to promote the automobile (the featured product) in a manner that avoids creating conflicts with the normal channels of distribution, e.g., promotional activity that avoids creating conflicts between the manufacturer and the dealerships for the automobile. A further reason for using a rebate may arise because the purchase price of a featured item, such as an automobile, may be higher than the credit limit of most credit card holders, and a credit card is being used as the method of payment. As shown at 702, the current rebate amount at the time of the on-line group-buying sale represented is $125. To make an offer in this sale, the buyer first clicks on the Make an Offer button 704.

FIG. 8 shows a screen 800 displayed to a buyer after clicking on the Make an Offer button 704 in FIG. 8. As shown at 802, the rebate with a current value of $125 has a fixed purchase price of $50. The buyer is requested to enter a dollar value for the rebate for which the buyer is prepared to purchase the rebate at a price of $50. As shown, the buyer has entered a rebate value of $500. As an ordinary artisan will recognize, the displays 700, 800 may be presented to customers using different formats while still accomplishing the invention described herein.

Figure 4:
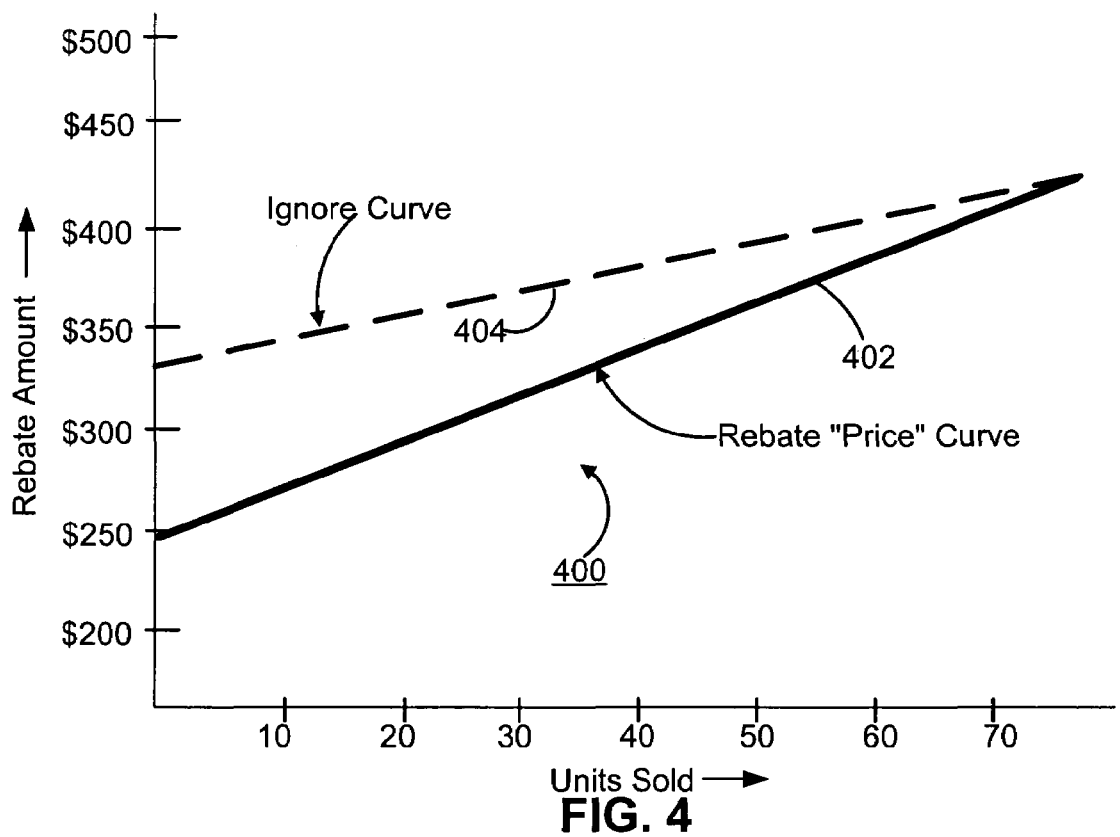

FIG. 4 shows price curves 400 for the Buick Century automobile rebate on-line group-buying sale shown in FIGS. 7 and 8, according to an embodiment of the invention. As shown, the number of rebates sold is plotted on the x-axis, and the rebate value amount is plotted on the y-axis. As in FIG. 3, the rebate value "price" curve 402 has a positive slope, representing increasing rebate value as more buyers make offers having rebate values between rebate value "price" curve 402 and ignore curve. For example, the offer shown in FIG. 8, requesting a rebate value of $500 for the fixed $50 purchase price will not be between the price curve 402 and the ignore curve 404 unless more than 80 offers between the price curve 402 and the ignore curve 404 have already been received.

FIG. 9 shows a screen 900 displayed to a buyer after the rebate on-line group-buying sale has been completed, assuming a final rebate value of $125. The buyer is instructed to print out a rebate certificate 902 and present it to a Duesenberg dealer when purchasing a new Duesenberg automobile. As shown at 904, the rebate certificate 902 has a unique certificate number for each successful buyer in the on-line group-buying sale, that allows the rebate certificate to be used only once by a buyer receiving it. Of course, an ordinary skilled artisan will recognize that the screen 900 and the rebate certificate 902 may have different formats and still accomplish the invention.

Figure 5:
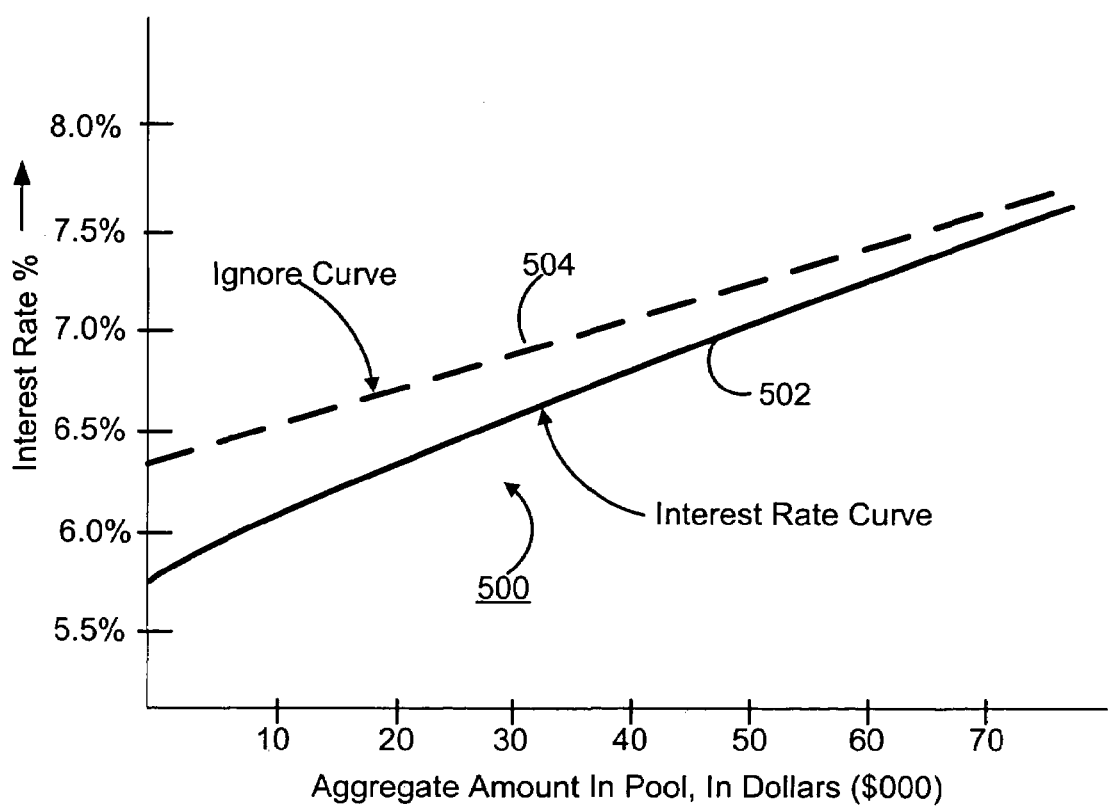

FIG. 5 shows price curves 500 for another embodiment of the invention. In this embodiment, the featured item in the on-line group-buying sale is a bank certificate of deposit. For this on-line group-buying sale, a networked system having essentially the same configuration as the system 100 of FIG. 1 is employed. Direct communication may be required between the bank selling the certificate of deposit and the buyers for fulfillment (e.g., in order to avoid use of a credit card with its percentage merchant fee). An aggregate amount in the certificate of deposit purchasing pool (in thousands of dollars) is plotted on the x-axis, and an interest rate in percent is plotted on the y-axis. As shown, an interest rate "price" curve 502 has a positive slope, representing an increased interest rate payable on the certificates of deposit with an increasing total in the certificate of deposit purchasing pool. Typically, in this embodiment, offers specifying an amount of the certificate of deposit and the desired interest rate are entered by the buyers. All such offers specifying an interest rate below an ignore curve 504 are used to increase the aggregate amount in the pool, and thus, the interest rate to be paid successful buyers in the on-line group-buying sale.

In practice, the on-line group-buying sale software 120 (FIG. 1) may provide the price curves 200, 300, 400 and 500 to the owner's and/or seller's marketing representatives for administration of the on-line group-buying sales, as is described in the related pending applications and issued patent. The computer code for the software 120 may need minor modifications from the code used to produce conventional price curves 200. If FIGS. 3–5 are inverted, it will be noted that their price curves 300, 400 and 500 may then typically have the same overall shape as the price curves 200 of FIG. 2. When inverted, the price curves 300, 400 and 500 would represent negative numbers. Therefore, by modifying the software 120 so that it can deal with negative numbers, then plotting the price curves 300, 400 and 500 with the absolute values of the negative numbers, the same code that would produce the curves 200 can be used to produce the curves 300, 400 and 500.

Modified pricing on-line group-buying sales can be conducted with greater or lesser direct intervention of the owner's or seller's merchandising representatives to control the progress of a sale, either with or without use of the price curves 300, 400 and 500. Thus, the sales can be directly administered throughout their progress by the merchandising representatives, or completely automatically controlled with more advanced on-line group-buying sale software 120. If the merchandising representatives are experienced enough, they can administer the sales without the use of price curves.

Figure 6:
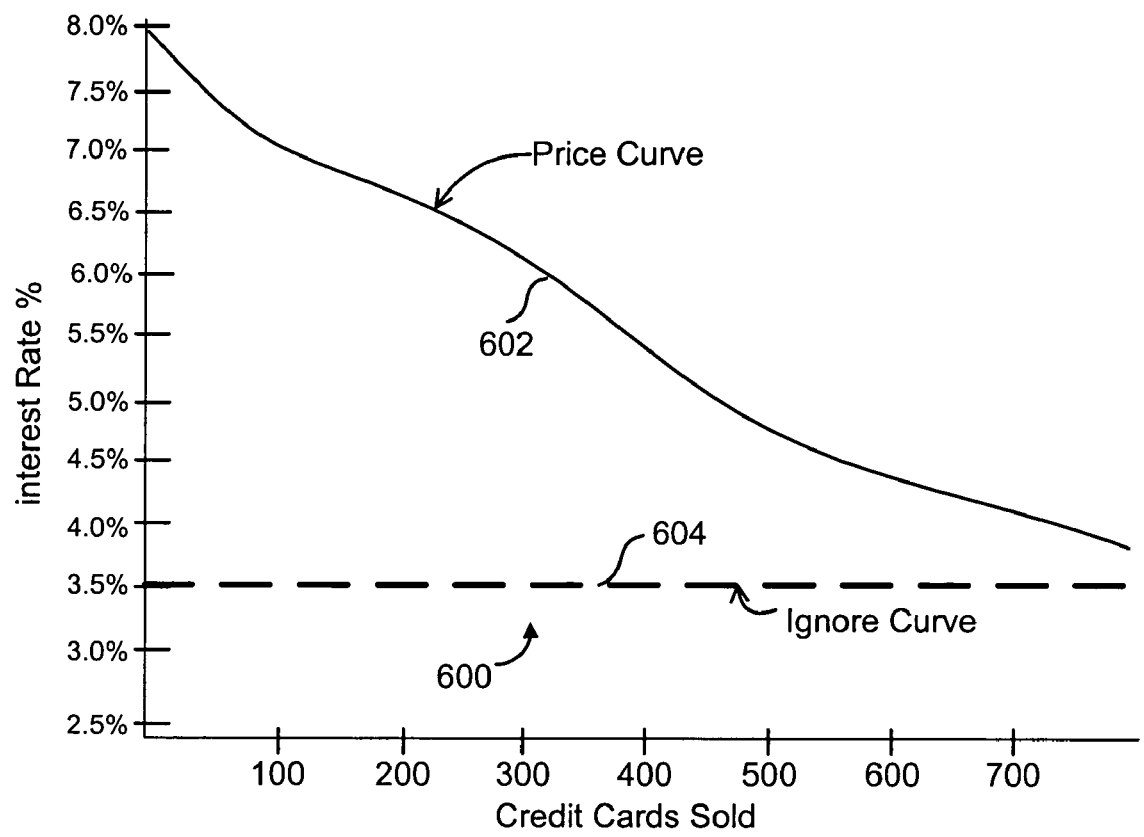

FIG. 6 shows price curves 600 for a further embodiment of the invention, in which the featured item is a credit instrument, for example, a credit card. In this embodiment, a price curve 602 may have a negative slope, representing a decrease in interest rate as more buyers make offers in the form of an interest rate they are willing to pay on the credit instrument between the price curve 602 and an ignore curve 604. The interest rate may either be for an initial, introductory rate or for a more permanent interest rate on the credit instrument. Alternatively, price curves with a positive slope could be employed for the on-line group-buying sale of credit instrument, if the price or value curve represents an increasing value of a premium, such as frequent flier miles, awarded with the credit instrument, such as through obtaining the credit instrument and/or use of the credit instrument.

Examples of on-line group-buying sales with price curves having increased values have been given. The invention can be utilized for other types of featured items as well, such as memberships in any type of organization (e.g., Costco, any web sites that charge membership fees, clubs, and the like) where the benefits of membership increase as more buyers join the on-line group-buying sale. Similarly, the invention can be used for any product or service sale with an accessory or related product or service that increases as more buyers join the on-line group-buying sale. Examples would include an on-line group-buying sale for a camera where buyers get a bag for the camera, film, a coupon for any number of accessories for the camera, or the like. The buyers joining the group get more and more of the add-ons as more buyers join the group. The increased add-ons could be unrelated to the product or service being sold, such as redeemable points, frequent flyer miles, Mercata$ (credits redeemable in on-line group-buying sales), and the like, as more buyers join the group. Use of this invention may allow sellers to maintain interest in products or services that are otherwise losing customer appeal by adding the excitement of increasing value in an on-line group-buying sale environment.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A system for carrying out an on-line group-buying sale of an item, the system comprising:
an e-commerce data processing system configured to provide the on-line group-buying sale of an item, the e-commerce data processing system further configured to associate the sale of the item with a price curve defined by prices of the item with respect to quantities associated with the item and a value curve defined by values of a non-price attribute of the item and the quantities assocaited with the item, wherein the e-commerce data processing system is further configured to increase the value of the non-price attribute of the item as more buyers make offers in the on-line group-buying sale and wherein the e-commerce data processing system further configured to hold constant the price of the item in response to an increase in the quantity of buyer offers;
a buyer data processing system coupled to the e-commerce data processing system and configured to receive buyer offers in the on-line group-buying sale of the item and to transmit the buyer offers to the e-commerce data processing system; and
a module configured to determine the price of the item in the on-line group buying sale responsive to buyer offers and the price curve.

2. The system of claim 1 wherein the non-price attribute of the item comprises an interest rate.

3. The system of claim 1 wherein the item comprises a security interest.

4. The system of claim 1 wherein the non-price attribute of the item comprises benefits assocaited with the item.

5. The system of claim 1 wherein the e-commerce data processing system is further configured to associate the sale of the item with an ignore curve defined by prices of the item with respect to quantities of the item; and wherein the buyer data processing system is further configured to exclude a buyer offer from the on-line group buying sale responsive to the ignore curve.

6. The system of claim 1 wherein the buyer offer comprises an offer to purchase the item at a specific price and a specific value of the non-price attribute of the item.

7. The system of claim 6 wherein the e-commerce data processing system is further configured to associate the sale of the item with an ignore curve defined by values of the non-price attribute of the item and quantities associated with the items; and wherein the buyer data processing system is further configured to exclude a buyer offer from the on-line group buying sale responsive to the ignore curve.

8. A computer-implemented method for carrying out an on-line group-buying sale of an item, the method comprising the steps of:
  conducting the on-line group-buying sale of an item, including associating the sale of the item with a price curve defined by prices of the item with respect to quantities associated with the item and a value curve defined by values of a non-price attribute of the item with respect to quantities associated with the item;
  receiving buyer offers in the on-line group-buying sale of the item;
  transmitting the buyer offers to an e-commerce data processing system; and
  determining the value of the non-price attribute of the item in response to buyer offers and the value curve including increasing the value of the non-price attribute of the item as more buyers make offers in the on-line group-buying sale; and holding constant the price of the item in response to an increase in the quantity of buyer offers.

9. The method of claim 8 wherein the non-price attribute of the item comprises an interest rate.

10. The method of claim 8 wherein the item comprises a security interest.

11. The method of claim 8 wherein the non-price attribute of the item comprises benefits associated with the item.

12. The method of claim 8 further comprising:
  providing the on-line group buying sale of an item, the sale of the item associated with an ignore curve defined by prices of the item with respect to quantities associated with the item; and
  excluding a buyer offer from the on-line group buying sale responsive to the ignore curve.

13. The method of claim 8 wherein the buyer offer comprises an offer to purchase the item at a specific price and a specific value of the non-price attribute of the item.

14. The method of claim 13 further comprising:
  providing the on-line group buying sale of an item, the sale of the item associated with an ignore curve defined by values of the non-price attribute of the item with respect to quantities associated with the item; and
  excluding a buyer offer from the on-line group buying sale responsive to the ignore curve.

15. A computer-implemented method for carrying out an on-line group-buying sale of an item, the method comprising the steps of:
  conducting the on-line group-buying sale of an item, the item including a price and a non-price attribute;
  receiving buyer offers in the on-line group-buying sale of the item;
  transmitting the buyer offers to an e-commerce data processing system;
  determining the value of the non-price attribute of the item responsive to buyer offers including increasing the value of the non-price attribute as more buyers make offers in the on-line group-buying sale; and
  determining the price of the item responsive to buyer offers including changing the price of the item as more buyers make offers in the on-line group buying sale.

16. The method of claim 15 further comprising
  specifying a value curve defined by value of the non-price attribute of the item and quantities of the items; and
  determining the value of the non-price attribute responsive to the value curve and buyer offers.

17. The method of claim 15 wherein the price of the item decreases and the value of the non-price attribute increases as the quantity of buyer offers increases.

18. The method of claim 15 wherein the price of the item stays constant as the quantity of buyer offers increases.

19. The method of claim 15 wherein the value of the non-price attribute increases as the quantity of buyer offers increases.

* * * * *